US012743733B2

(12) United States Patent
Rudraraju et al.

(10) Patent No.: US 12,743,733 B2
(45) Date of Patent: Sep. 22, 2026

(54) SYSTEM AND METHOD FOR REQUIREMENTS SCORING AND MALFEASANCE DETECTION VIA MACHINE LEARNING

(71) Applicant: BANK OF AMERICA CORPORATION, Charlotte, NC (US)

(72) Inventors: Rama Krishnam Raju Rudraraju, Hyderabad (IN); Om Purushotham Akarapu, Hyderabad (IN); Adluri Harshitha, Hyderabad (IN); Sathish Kondabathula, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 19/008,111

(22) Filed: Jan. 2, 2025

(65) Prior Publication Data

US 2026/0187744 A1 Jul. 2, 2026

(51) Int. Cl.

| | |
|---|---|
| ***G06Q 10/10*** | (2023.01) |
| ***G06Q 10/06*** | (2023.01) |
| ***G06Q 10/0635*** | (2023.01) |
| ***G06Q 20/40*** | (2012.01) |
| ***G06Q 30/02*** | (2023.01) |
| ***G06Q 30/06*** | (2023.01) |
| ***G06Q 40/08*** | (2012.01) |
| ***G06Q 40/12*** | (2023.01) |

(Continued)

(52) U.S. Cl.

CPC ....... *G06Q 50/265* (2013.01); *G06Q 10/0635* (2013.01); *G06Q 20/40* (2013.01); *G06Q 40/12* (2013.12); *G06Q 40/00* (2013.01); *G06Q 40/02* (2013.01)

(58) Field of Classification Search

CPC .. G06Q 50/265; G06Q 10/0635; G06Q 20/40; G06Q 40/12; G06Q 40/00; G06Q 40/02

USPC .................................................. 705/1.1–912

See application file for complete search history.

(56) References Cited

U.S. PATENT DOCUMENTS

| | | | | |
|---|---|---|---|---|
| 10,616,256 | B2 * | 4/2020 | Kursun | H04L 41/145 |
| 11,321,771 | B1 | 5/2022 | Horesh et al. | |

(Continued)

FOREIGN PATENT DOCUMENTS

| | | |
|---|---|---|
| TW | M647003 U | 10/2023 |

*Primary Examiner* — Jonathan P Ouellette

(74) *Attorney, Agent, or Firm* — Moore & Van Allen PLLC; Nicholas C. Russell

(57) ABSTRACT

Systems, computer program products, and methods are described herein for requirements scoring and malfeasance detection via machine learning. The present disclosure includes receiving resource transfer data associated with an account identifier, determining an obligation record in the resource transfer data based on the transfer entries comprising an obligation transaction, segmenting, for each of the transfer entries, a string element into discrete tokens, normalizing the discrete tokens into root tokens, grouping related root tokens into grouped root tokens, transforming the grouped root tokens into categorical feature vectors, determining a probability of each of the categorical feature vectors being associated with requirements, tagging, as requirements resource transfers, the categorical feature vectors upon a first condition where the probability is above a predetermined threshold, and storing the requirements resource transfers in a repository.

15 Claims, 6 Drawing Sheets

(51) Int. Cl.

| | |
|---|---|
| ***G06Q 50/26*** | (2012.01) |
| *G06Q 40/00* | (2023.01) |
| *G06Q 40/02* | (2023.01) |

(56) References Cited

U.S. PATENT DOCUMENTS

| | | | | |
|---|---|---|---|---|
| 11,455,637 | B2 | 9/2022 | Ratnapu et al. | |
| 11,455,638 | B2 | 9/2022 | Kang et al. | |
| 11,501,239 | B2 | 11/2022 | Cmielowski et al. | |
| 11,514,444 | B2 | 11/2022 | Cheng et al. | |
| 11,562,372 | B2 | 1/2023 | Pati et al. | |
| 11,587,092 | B2 | 2/2023 | O'Flynn et al. | |
| 11,610,271 | B1 | 3/2023 | Rusu et al. | |
| 11,733,053 | B1 * | 8/2023 | Russo | G01C 21/3469 701/123 |
| 11,861,666 | B2 | 1/2024 | O'Flynn et al. | |
| 12,450,494 | B1 * | 10/2025 | Mysore | G06F 11/3692 |
| 2017/0206596 | A1 | 7/2017 | Zhang | |
| 2023/0252557 | A1 * | 8/2023 | Zhuang | G06N 3/044 705/35 |
| 2023/0306429 | A1 | 9/2023 | Shachar et al. | |
| 2023/0385838 | A1 | 11/2023 | Butvinik et al. | |
| 2024/0378604 | A1 | 11/2024 | Wanage et al. | |
| 2025/0299059 | A1 * | 9/2025 | Ahmed | G06N 3/045 |

* cited by examiner

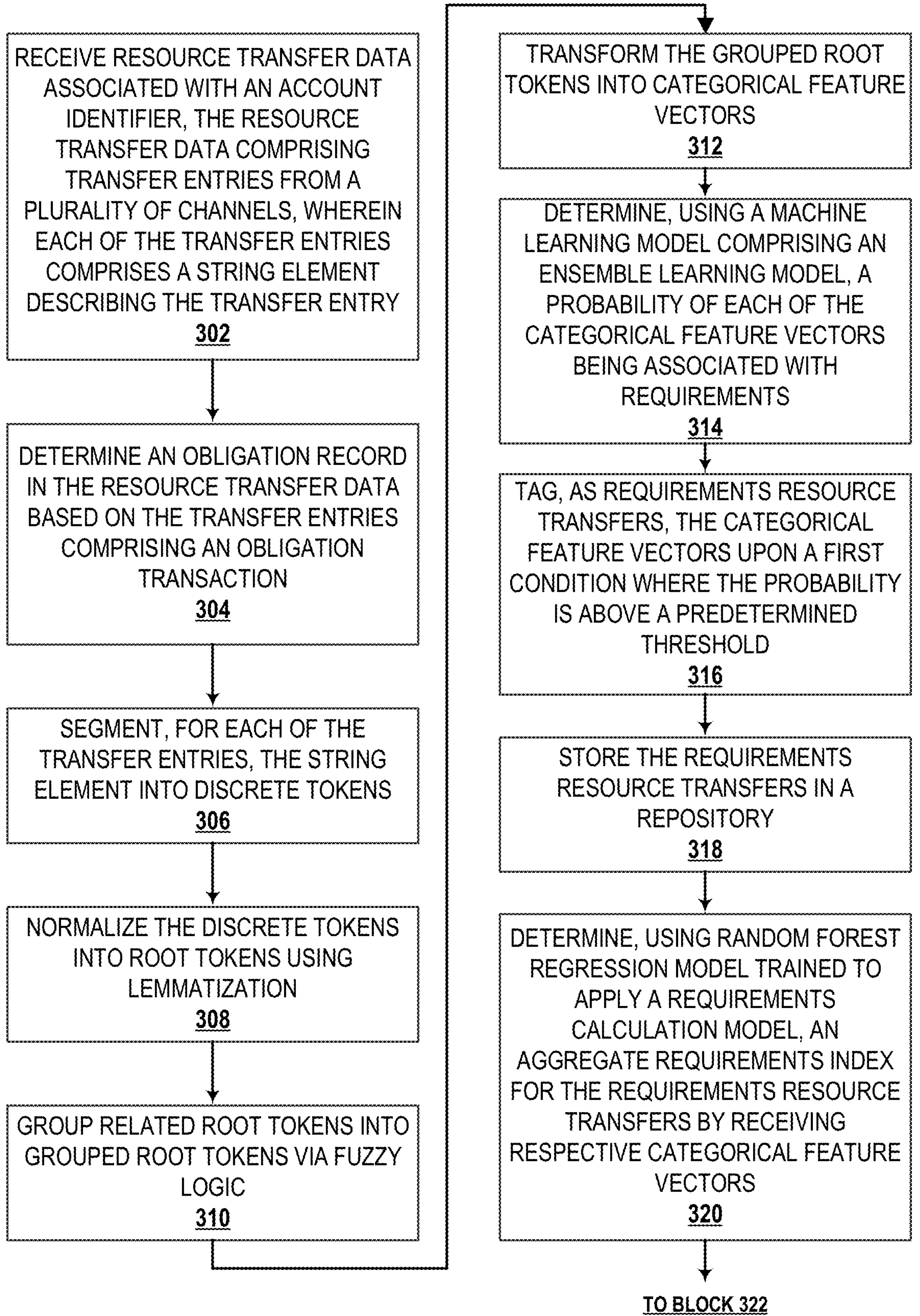
*FIG.* 3A

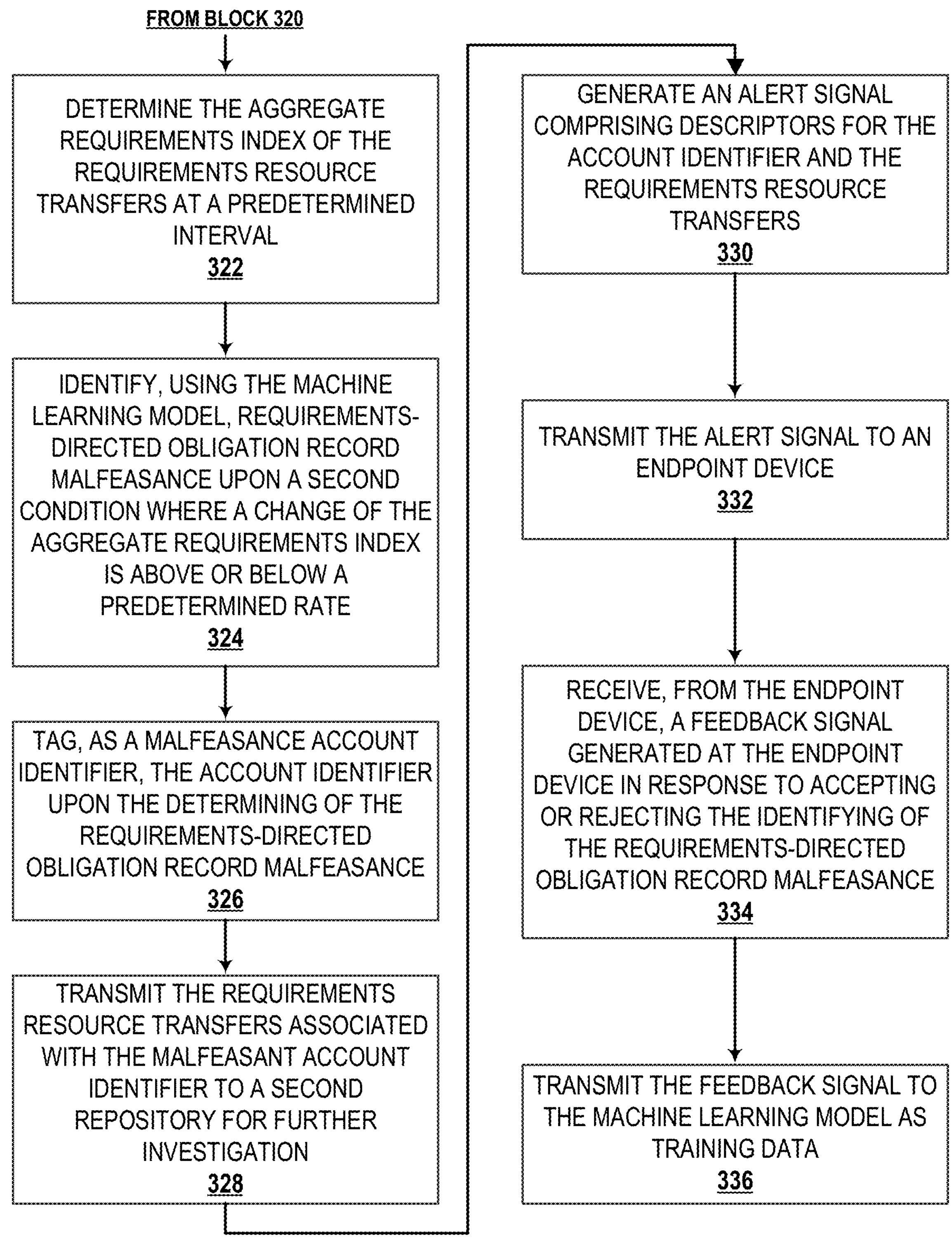
*FIG.* 3B

SYSTEM AND METHOD FOR REQUIREMENTS SCORING AND MALFEASANCE DETECTION VIA MACHINE LEARNING

TECHNOLOGICAL FIELD

Example implementations of the present disclosure relate to a system and method for requirements scoring and malfeasance detection via machine learning.

BACKGROUND

Entities managing obligation records increasingly prioritize aligning with requirements tied to sustainability and operational performance objectives. These requirements are frequently categorized into three scopes to facilitate quantification and management: Scope 1, Scope 2, and Scope 3. Scope 1 relates to requirements arising from activities directly controlled by the company, such as those stemming from operational facilities or equipment. Scope 2 addresses requirements associated with the consumption of externally provided resources, such as purchased energy. Scope 3 encompasses a broader range of indirect requirements along a company's value chain, including those linked to procurement, transportation, and lifecycle impacts of goods and services. Unlike Scopes 1 and 2, Scope 3 requirements present challenges due to their broad scope and undefined boundaries. Challenges become more pronounced when customers of entities seek obligation records intended to address Scope 3 requirements but fail to implement measures that substantively meet those requirements. These scenarios result in obligation records that do not contribute meaningfully to fulfilling specified requirements. This disconnect underscores the need for enhanced mechanisms to ensure that obligation records are effectively aligned with verifiable achievement of defined requirements across all scopes. Accordingly, there exists a need for systems and methods for requirements scoring and malfeasance detection via machine learning.

BRIEF SUMMARY

Systems, methods, and computer program products are provided for requirements scoring and malfeasance detection via machine learning.

In one aspect, a system for requirements scoring and malfeasance detection via machine learning is presented. The system may include a processing device, and a non-transitory storage device containing instructions, when executed by the processing device, the instructions cause the processing device to perform the steps of receiving resource transfer data associated with an account identifier, the resource transfer data including transfer entries from a plurality of channels, wherein each of the transfer entries may include a string element describing the transfer entry, determining an obligation record in the resource transfer data based on the transfer entries including an obligation transaction, segmenting, for each of the transfer entries, the string element into discrete tokens, normalizing the discrete tokens into root tokens using lemmatization, grouping related root tokens into grouped root tokens via fuzzy logic, transforming the grouped root tokens into categorical feature vectors, determining, using a machine learning model including an ensemble learning model, a probability of each of the categorical feature vectors being associated with requirements, tagging, as requirements resource transfers, the categorical feature vectors upon a first condition where the probability is above a predetermined threshold, and storing the requirements resource transfers in a repository.

In some implementations, the instructions may further cause the processing device to perform the steps of determining, using random forest regression model trained to apply a requirements calculation model, an aggregate requirements index for the requirements resource transfers by receiving respective categorical feature vectors.

In some implementations, the instructions may further cause the processing device to perform the steps of determining the aggregate requirements index of the requirements resource transfers at a predetermined interval, and identifying, using the machine learning model, requirements-directed obligation record malfeasance upon a second condition where a change of the aggregate requirements index is above or below a predetermined rate.

In some implementations, the instructions may further cause the processing device to perform the steps of tagging, as a malfeasance account identifier, the account identifier upon the determining of the requirements-directed obligation record malfeasance, transmitting the requirements resource transfers associated with the malfeasant account identifier to a second repository for further investigation, generating an alert signal including descriptors for the account identifier and the requirements resource transfers, and transmitting the alert signal to an endpoint device.

In some implementations, the instructions may further cause the processing device to perform the steps of receiving, from the endpoint device, a feedback signal generated at the endpoint device in response to accepting or rejecting the identifying of the requirements-directed obligation record malfeasance, and transmitting the feedback signal to the machine learning model as training data.

In some implementations, the alert signal causes the endpoint device to display an alert banner consisting of at least one of: (i) the account identifier, (ii) the aggregate requirements index, (iii) obligation record details, and (iv) a rate of the change of the aggregate requirements index.

In some implementations, the feedback signal is generated as a result of an interaction with the alert banner.

In another aspect, a computer program product for requirements scoring and malfeasance detection via machine learning is presented. The computer program product may include a non-transitory computer-readable medium including code causing an apparatus to receive resource transfer data associated with an account identifier, the resource transfer data including transfer entries from a plurality of channels, wherein each of the transfer entries may include a string element describing the transfer entry, determine an obligation record in the resource transfer data based on the transfer entries including an obligation transaction, segment, for each of the transfer entries, the string element into discrete tokens, normalize the discrete tokens into root tokens using lemmatization, group related root tokens into grouped root tokens via fuzzy logic, transform the grouped root tokens into categorical feature vectors, determine, using a machine learning model including an ensemble learning model, a probability of each of the categorical feature vectors being associated with requirements, tag, as requirements resource transfers, the categorical feature vectors upon a first condition where the probability is above a predetermined threshold, and store the requirements resource transfers in a repository.

In some implementations, the code may further cause the apparatus to determine, using random forest regression model trained to apply a requirements calculation model, an aggregate requirements index for the requirements resource transfers by receiving respective categorical feature vectors.

In some implementations, the code may further cause the apparatus to determine the aggregate requirements index of the requirements resource transfers at a predetermined interval, and identify, using the machine learning model, requirements-directed obligation record malfeasance upon a second condition where a change of the aggregate requirements index is above or below a predetermined rate.

In some implementations, the code may further cause the apparatus to tag, as a malfeasance account identifier, the account identifier upon the determining of the requirements-directed obligation record malfeasance, transmit the requirements resource transfers associated with the malfeasant account identifier to a second repository for further investigation, generate an alert signal including descriptors for the account identifier and the requirements resource transfers, and transmit the alert signal to an endpoint device.

In some implementations, the code may further cause the apparatus to receive, from the endpoint device, a feedback signal generated at the endpoint device in response to accepting or rejecting the identifying of the requirements-directed obligation record malfeasance, and transmit the feedback signal to the machine learning model as training data.

In some implementations, the alert signal causes the endpoint device to display an alert banner consisting of at least one of: (i) the account identifier, (ii) the aggregate requirements index, (iii) obligation record details, and (iv) a rate of the change of the aggregate requirements index.

In some implementations, the feedback signal is generated as a result of an interaction with the alert banner.

In yet another aspect, a method for requirements scoring and malfeasance detection via machine learning is presented. The method may include receiving resource transfer data associated with an account identifier, the resource transfer data including transfer entries from a plurality of channels, wherein each of the transfer entries may include a string element describing the transfer entry, determining an obligation record in the resource transfer data based on the transfer entries including an obligation transaction, segmenting, for each of the transfer entries, the string element into discrete tokens, normalizing the discrete tokens into root tokens using lemmatization, grouping related root tokens into grouped root tokens via fuzzy logic, transforming the grouped root tokens into categorical feature vectors, determining, using a machine learning model including an ensemble learning model, a probability of each of the categorical feature vectors being associated with requirements, tagging, as requirements resource transfers, the categorical feature vectors upon a first condition where the probability is above a predetermined threshold, and storing the requirements resource transfers in a repository.

In some implementations, the method may further include determining, using random forest regression model trained to apply a requirements calculation model, an aggregate requirements index for the requirements resource transfers by receiving respective categorical feature vectors.

In some implementations, the method may further include determining the aggregate requirements index of the requirements resource transfers at a predetermined interval, and identifying, using the machine learning model, requirements-directed obligation record malfeasance upon a second condition where a change of the aggregate requirements index is above or below a predetermined rate.

In some implementations, the method may further include tagging, as a malfeasance account identifier, the account identifier upon the determining of the requirements-directed obligation record malfeasance, transmitting the requirements resource transfers associated with the malfeasant account identifier to a second repository for further investigation, generating an alert signal including descriptors for the account identifier and the requirements resource transfers, and transmitting the alert signal to an endpoint device.

In some implementations, the method may further include receiving, from the endpoint device, a feedback signal generated at the endpoint device in response to accepting or rejecting the identifying of the requirements-directed obligation record malfeasance, and transmitting the feedback signal to the machine learning model as training data.

In some implementations, the alert signal causes the endpoint device to display an alert banner consisting of at least one of: (i) the account identifier, (ii) the aggregate requirements index, (iii) obligation record details, and (iv) a rate of the change of the aggregate requirements index.

The above summary is provided merely for purposes of summarizing some example implementations to provide a basic understanding of some aspects of the present disclosure. Accordingly, it will be appreciated that the above-described implementations are merely examples and should not be construed to narrow the scope or spirit of the disclosure in any way. It will be appreciated that the scope of the present disclosure encompasses many potential implementations in addition to those here summarized, some of which will be further described below.

BRIEF DESCRIPTION OF THE DRAWINGS

Having thus described implementations of the disclosure in general terms, reference will now be made the accompanying drawings. The components illustrated in the Figures may or may not be present in certain implementations described herein. Some implementations may include fewer (or more) components than those shown in the Figures.

Figure 1A:
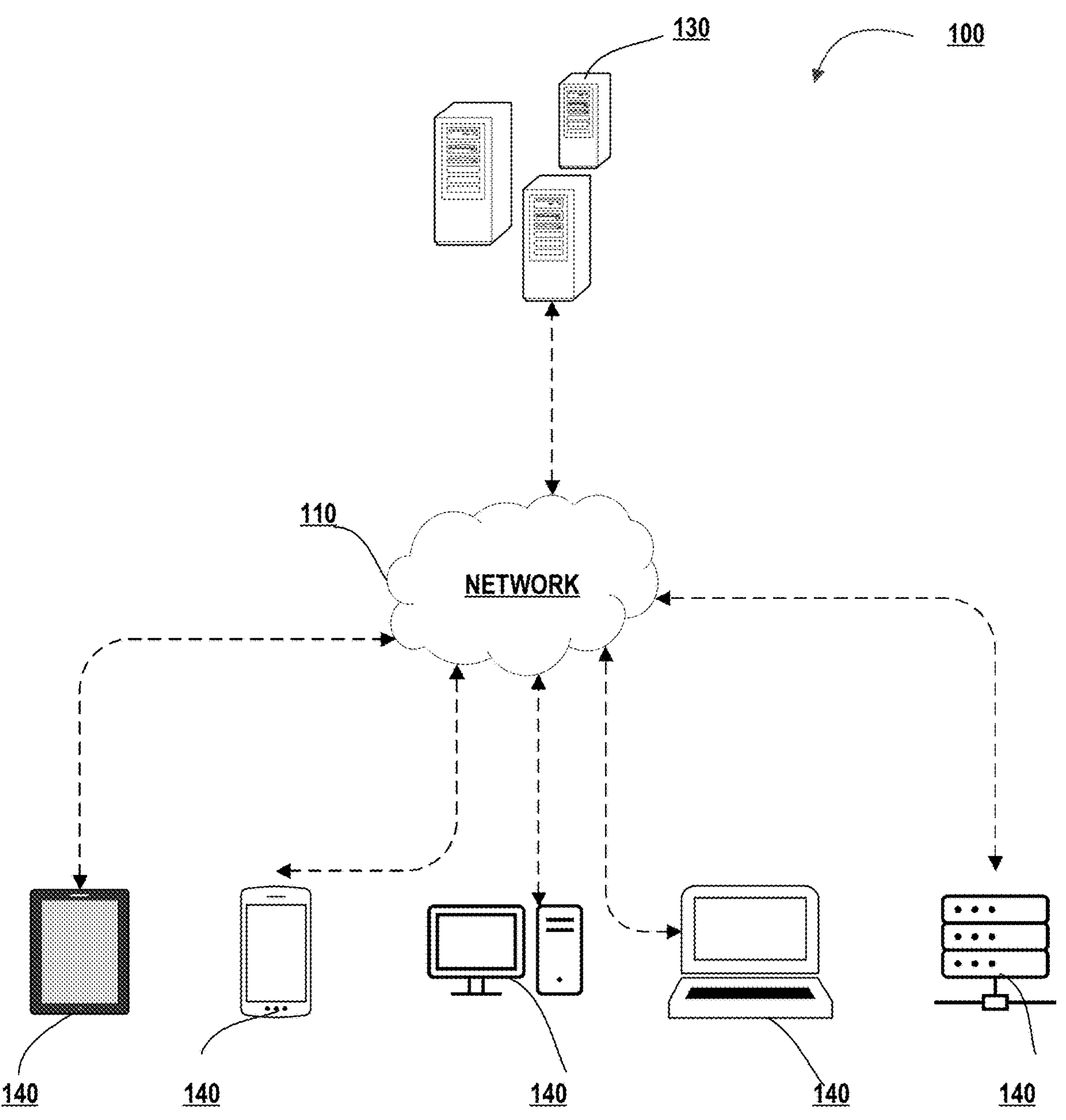
Figure 1B:
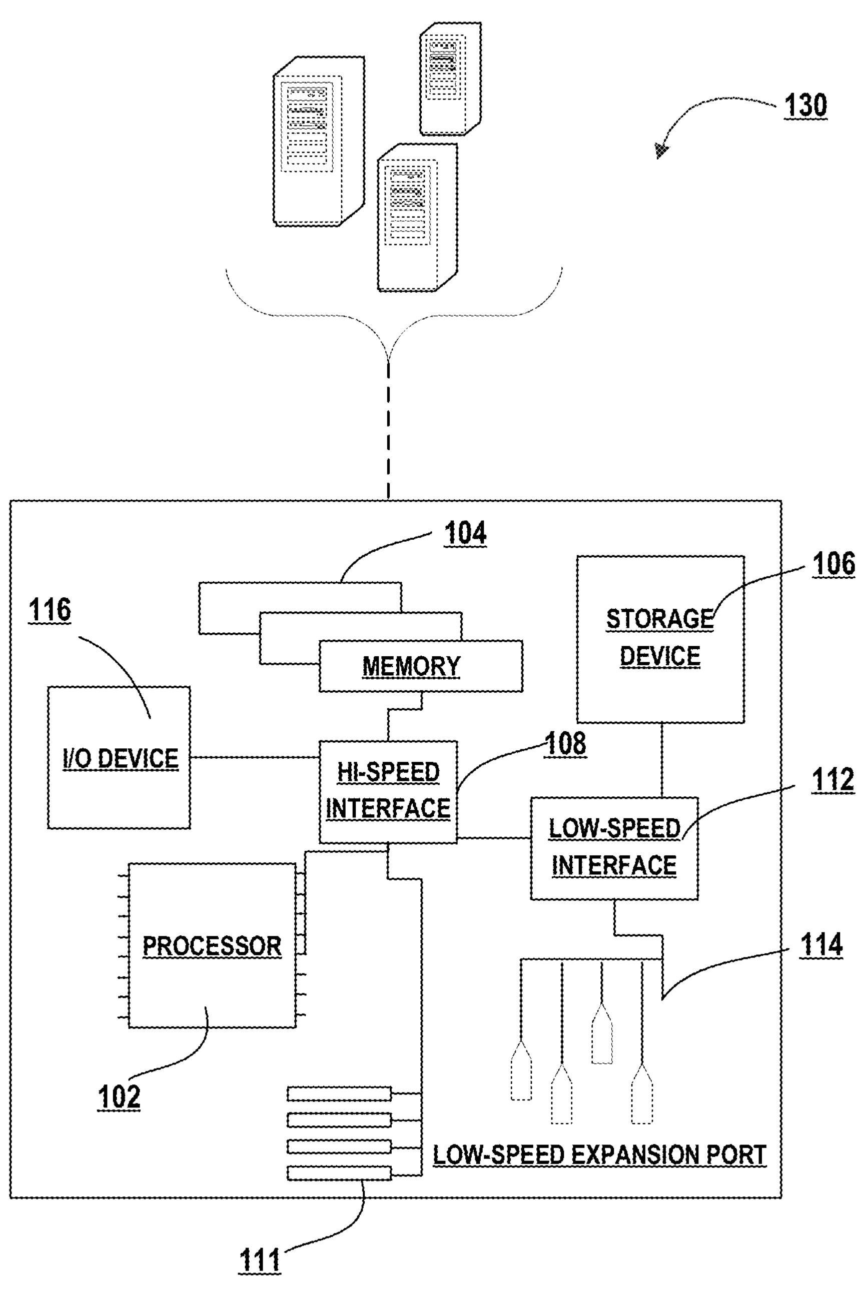
Figure 1C:
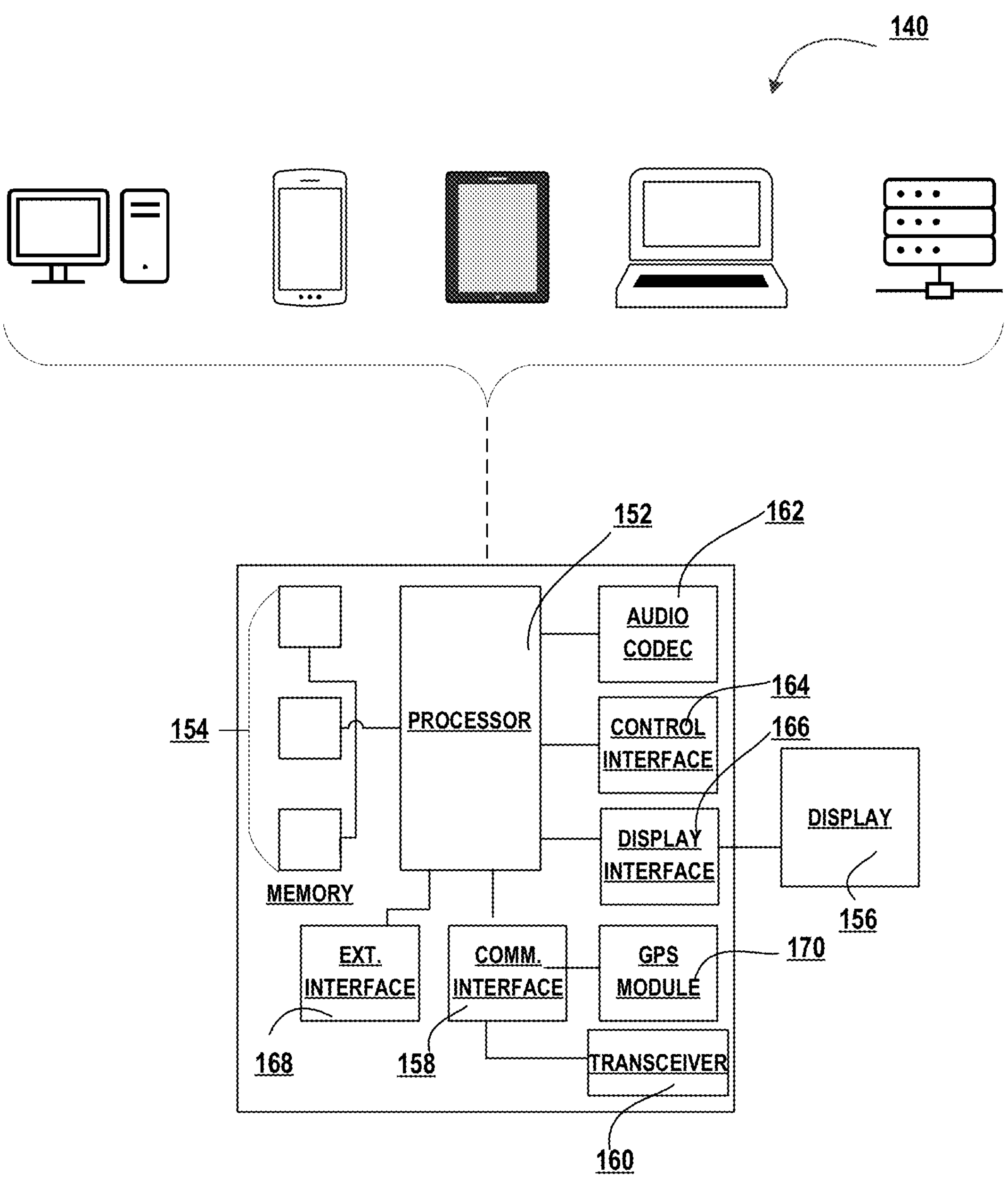
Figure 2:
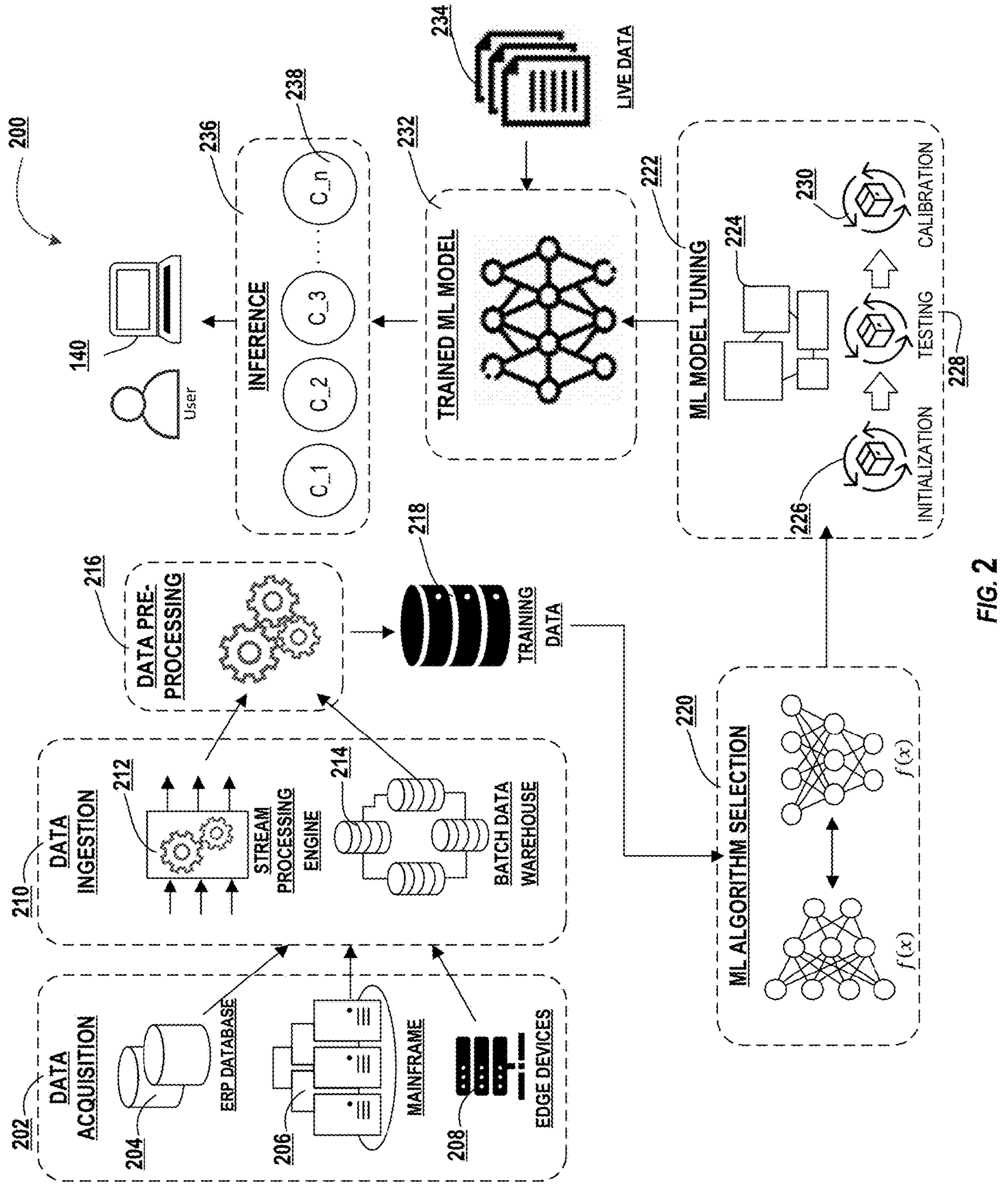

FIGS. 1A-1C illustrate technical components of an exemplary distributed computing environment for requirements scoring and malfeasance detection via machine learning, in accordance with an implementation of the disclosure;

FIG. 2 illustrates an exemplary machine learning model subsystem architecture, in accordance with an implementation of the disclosure;

FIGS. 3A-3B illustrate a process flow for requirements scoring and malfeasance detection via machine learning, in accordance with an implementation of the disclosure.

DETAILED DESCRIPTION

Implementations of the present disclosure will now be described more fully hereinafter with reference to the accompanying drawings, in which some, but not all, implementations of the disclosure are shown. Indeed, the disclosure may be implemented in many different forms and should not be construed as limited to the implementations set forth herein; rather, these implementations are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" may be also used herein. Furthermore, when it may be said herein that something may be "based on" something else, it may be based on one or more other things as well. In other words, unless expressly indicated otherwise, as used herein "based on"

means “based at least in part on” or “based at least partially on.” Like numbers refer to like elements throughout.

As used herein, an “entity” may be any institution employing information technology resources and particularly technology infrastructure configured for processing large amounts of data. Typically, these data can be related to the people who work for the entity, its products or applications, the customers or any other aspect of the operations of the entity. As such, the entity may be any institution, group, association, financial institution, establishment, company, union, authority or the like, employing information technology resources for processing large amounts of data.

As described herein, a “user” may be an individual associated with an entity. As such, in some implementations, the user may be an individual having past relationships, current relationships or potential future relationships with an entity. In some implementations, the user may be an employee (e.g., an associate, a project manager, an IT specialist, a manager, an administrator, an internal operations analyst, or the like) of the entity or enterprises affiliated with the entity.

As used herein, a “user interface” or “display” may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an “engine” may refer to core elements of a computer program, or part of a computer program that serves as a foundation for a larger piece of software and drives the functionality of the software. The term “engine” may be used herein interchangeably with “module” or “model”. An engine may be self-contained, but externally controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some implementations, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system. In some implementations, an engine may implement a machine learning model or generative AI model to perform functions as a foundation for the larger piece of software that drives the functionality of the software. The machine learning model or generative AI model for any given engine may be self-contained (e.g., without interaction with other engines), or the machine learning model or generative AI model may be shared across one or more engines. In other words, some implementations of the larger piece of software many implement multiple machine learning models or generative AI models to perform functions of the various engines. In other implementations, a single machine learning model or generative AI model may be shared across one or more engines to perform the functions attributed thereto as described herein.

It should also be understood that “operatively coupled,” as used herein, means that the components may be formed integrally with each other, or may be formed separately and coupled together. Furthermore, “operatively coupled” means that the components may be formed directly to each other, or to each other with one or more components located between the components that are operatively coupled together. Furthermore, “operatively coupled” may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, “operatively coupled” may mean that components may be electronically connected and/or in fluid communication with one another.

It should be understood that the word “exemplary” may be used herein to mean “serving as an example, instance, or illustration.” Any implementation described herein as “exemplary” is not necessarily to be construed as advantageous over other implementations.

As used herein, “determining” may encompass a variety of actions. For example, “determining” may include calculating, computing, processing, deriving, investigating, ascertaining, and/or the like. Furthermore, “determining” may also include receiving (e.g., receiving information), accessing (e.g., accessing data in a memory), and/or the like. Also, “determining” may include resolving, selecting, choosing, calculating, establishing, and/or the like. Determining may also include ascertaining that an element matches a predetermined criterion, including that a threshold has been met, passed, exceeded, and so on.

As used herein, “requirements” may refer to specific standards, thresholds, or levels associated with emissions, resource usage, or the like, including but not limited to carbon dioxide emissions, greenhouse gas outputs, or other pollutants. These “requirements” may also encompass related environmental impact metrics, sustainability benchmarks, or similar quantitative or qualitative criteria that pertain to compliance, performance, or regulatory objectives. A “requirements score” may refer to a formulaic calculation derived from the assessment of such requirements, wherein the score represents a quantified measure of compliance, impact, or performance against the specified standards. The calculation of the requirements score may involve factors such as measured emission levels, estimated emissions levels, weighted contributions of different pollutants, adherence to predefined thresholds, or other variables relevant to the requirements under consideration. The act of “requirement scoring” is implementing a formula to arrive at the foregoing “requirements score,” oftentimes implementing formulas or algorithms defined in industry-wide standards, although proprietary or otherwise unique standards may be used to define such formulas or algorithms.

Entities face significant technical challenges in accurately quantifying and managing emissions, particularly Scope 3 emissions, which encompass all indirect emissions across the value chain. These challenges arise from the complexity and variability of supply chain activities, as well as the lack of standardized methods for identifying and attributing emissions to specific entities or processes. For financial institutions, for example, the problem is exacerbated by the need to evaluate and verify emissions data associated with obligation recipients, especially when such loans are purportedly intended to reduce emissions. The lack of precise tools and methodologies to track, analyze, and ensure accountability for emission reductions, particularly those involving Scope 3, prevents entities from achieving verifiable and actionable results. This issue is further compounded by the integration of disparate data sources, which often lack interoperability, and the dynamic nature of emissions data, which requires real-time analysis and adaptive reporting mechanisms.

Current solutions to this problem include generalized carbon accounting frameworks, third-party certification systems, and self-reported emissions data from entities receiving financial support. These approaches rely heavily on manual data collection, heuristic modeling, and static assumptions, which are inadequate for addressing the dynamic and interconnected nature of emissions across Scope 3 categories. Third-party certifications, while helpful for some aspects of accountability, often lack the granularity and scalability required to address complex supply chain emissions. Moreover, these methods provide limited verification of the actual impact of financial instruments, such as carbon loans, on achieving measurable reductions in greenhouse gas emissions.

The inadequacy of these solutions lies in their inability to integrate and analyze real-time, high-resolution data from diverse sources, creating a disconnect between financial activities and actual emission outcomes. This technical gap has created a long-felt need for robust, scalable systems that can accurately attribute emissions across all scopes, validate the efficacy of carbon reduction measures, and provide actionable insights to both financial institutions and their clients. Without such systems, entities remain constrained by imprecise methods, leading to a lack of accountability and transparency that undermines efforts to meet global carbon reduction targets.

Addressing these challenges requires the establishment of a system and method for requirements scoring and malfeasance detection via machine learning, which provides for the implementation of one or more specialized machine learning model(s) to not only identify transactions in a ledger that are related to emissions, but also to calculate an emissions score for the account (or user, or entity) as a whole, and subsequently perform the emissions calculation at a predetermined interval to determine if malfeasance related to the emissions-based obligation is potentially occurring. The machine learning model(s) may be continuously improved through feedback-based training that improves the detection (i.e., determination) of malfeasance over time.

To do so, transactions of an entity account may be received (e.g., via a ledger, the ledger having transactions from numerous channels). The presence of an emissions-directed obligation record (i.e., a "carbon finance loan" to assist entities reduce carbon emissions) may be determined based on the transaction entries. The alphanumeric description of each transaction entry may then be segmenting into tokens, normalized into root tokens using lemmatization, grouped (e.g., using fuzzy logic), vectorized into categorical feature vectors (e.g., via one-hot encoding). Based on this, a probability of each of the transactions as being associated with requirements (e.g., emissions) may be determined by an ensemble learning model (e.g., a random forest model), and these transactions may be tagged and stored in a repository if the probability is above a predetermined threshold. A requirements calculation formula may be applied by a random forest regression model to determine a requirements score for the transactions related to requirements. The requirements score may be recalculated at a predetermined interval. Requirements-based obligation malfeasance (i.e., loan malfeasance) may be detected if the change of the requirements score is above or below a predetermined rate, and the account and/or transactions may be tagged and sent to another repository for further investigation. An alert signal may be generated, having details about the account and transactions, and the alert may be transmitted to an endpoint device to display an alert. Feedback (e.g., interacting with the alert) may be provided at the endpoint device in response to accepting or rejecting the transactions as constituting malfeasance, and this feedback may be used as training data for the ML model.

What is more, the present disclosure provides a technical solution to a technical problem. As described herein, the technical problem includes the inability of current compliance scoring systems in entities to reliably quantify, verify, and enforce compliance with broad and complex requirements across emissions scopes, particularly in the context of obligation records, due to inadequate mechanisms for accurate scoring and detection of non-compliance. The present disclosure embraces an improvement over existing solutions by allowing for scoring of compliance metrics (i.e., requirements scoring) (i) with fewer steps to achieve the solution (e.g., receiving resource transfers from multiple channels without having to pre-sort, using batch processing to consolidate requests, parallel processing), thus reducing the amount of network resources, such as processing resources, storage resources, network resources, and/or the like, that are being used, (ii) providing a more accurate solution to problem, thus reducing the number of resources required to remedy any errors made due to a less accurate solution (e.g., implementing a continuous feedback mechanism to improve the detection of malfeasance as it relates to obligation records, and applying, systematically, formulas for requirements scoring that reduce inaccuracies that result from inconsistent application of formulas otherwise), (iii) removing manual input and waste from the implementation of the solution, thus improving speed and efficiency of the process and conserving network resources (e.g., implementing machine learning model(s) to automatically identify resource transfers that are related to requirements, automatically calculate requirements scores, and automatically detect malfeasance as it relates to obligation records), (iv) determining an optimal amount of resources that need to be used to implement the solution, thus reducing network traffic and load on existing network resources (e.g., by prioritizing traffic for analyzing obligation records of only those deemed to potentially be malfeasance, caching resource transfers that are related to requirements in a separate repository, using deduplication techniques in natural language processing to group related root words/tokens). In other words, the solution may bypass a series of steps previously implemented, thus further conserving network resources. Furthermore, the technical solution described herein uses a rigorous, computerized process to perform specific tasks and/or activities that were not previously performed.

FIGS. 1A-1C illustrate technical components of an exemplary distributed computing environment 100 for requirements scoring and malfeasance detection via machine learning, in accordance with an implementation of the disclosure. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an implementation of the distributed computing environment 100, and it will be appreciated that in other implementations one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some implementations, the system 130 and the endpoint device(s) 140 may have a client-server relationship in which the endpoint device(s) 140 are remote devices that request and receive application from a centralized server, i.e., the system 130. In some other implementations, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The endpoint device(s) 140 may represent various forms of electronic devices, including user input devices such as personal digital assistants, cellular telephones, smartphones, laptops, desktops, and/or the like, input devices such as resource transfer terminals, electronic resource transfer units, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. In addition to shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an implementation of the disclosure. As shown in FIG. 1B, the system 130 may include a processing device 102, memory 104, input/output (I/O) device 116, and a storage device 106. The system 130 may also include a high-speed interface 108 connecting to the memory 104, and a low-speed interface 112 connecting to a low-speed bus 114 and a storage device 106. Each of the components 102, 104, 108, 110, and 112 may be operatively coupled to one another using various buses and may be mounted on a common motherboard or in other manners as appropriate. As described herein, the processing device 102 may include a number of subsystems to execute the portions of processes described herein. Each subsystem may be a self-contained component of a larger system (e.g., system 130) and capable of being configured to execute specialized processes as part of the larger system.

The processing device 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processing devices, along with multiple memories, and/or I/O devices, to execute the processes described herein. In other words, as used herein, a "processing device" means one processing device (e.g., a microprocessor) that performs the defined functions or a plurality of processing devices (e.g., microprocessors) that collectively perform defined functions such that the execution of the individual defined functions may be divided amongst such processing devices.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly implemented in an information carrier. The computer program product may also contain instructions that, when executed, perform one or more methods, such as those described above. The information carrier may be a non-transitory computer- or machine-readable storage medium, such as the memory 104, the storage device 106, or memory on processing device 102.

The high-speed interface 108 manages bandwidth-intensive operations for the system 130, while the low-speed controller 112 manages lower bandwidth-intensive operations. Such allocation of functions is exemplary only. In some implementations, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an implementation of the disclosure. As shown in FIG. 1C, the endpoint device(s) 140 includes a processing device 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processing device 152 is configured to execute instructions within the endpoint device(s) 140, including instructions stored in the memory 154, which in one implementation includes the instructions of an application that may perform the functions disclosed herein, including certain logic, data processing, and data storing functions. The processing device may be implemented as a chipset of chips that include separate and multiple analog and digital processors. The processing device may be configured to provide, for example, for coordination of the other components of the endpoint device(s) 140, such as control of user interfaces, applications run by endpoint device(s) 140, and wireless communication by endpoint device(s) 140.

The processing device 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processing device 152. In addition, an external interface 168 may be provided in communication with processing device 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory Module) card interface. Such expansion memory may provide extra storage space for endpoint device(s) 140 or may also store applications or other information therein. In some implementations, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly implemented in an information carrier. The computer program product contains instructions that, when executed, perform one or more methods, such as those described herein. The information carrier is a computer- or machine-readable medium, such as the memory 154, expansion memory, memory on processing device 152, or a propagated signal that may be received, for example, over transceiver 160 or external interface 168.

In some implementations, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link);

the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to endpoint device(s) 140, which may be used as appropriate by applications running thereon, and in some implementations, one or more applications operating on the system 130.

The endpoint device(s) 140 may also communicate audibly using audio codec 162, which may receive spoken information from a user and convert the spoken information to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some implementations, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning model subsystem architecture 200, in accordance with an implementation of the disclosure. The machine learning subsystem 200 may include a data acquisition engine 202, data ingestion engine 210, data pre-processing engine 316, machine learning model tuning engine 222, and inference engine 236.

The data acquisition engine 202 may identify various internal and/or external data sources to generate, test, and/or integrate new features for training the machine learning model. These internal and/or external data sources 204, 206, and 208 may be initial locations where the data originates or where physical information is first digitized. The data acquisition engine 202 may identify the location of the data and describe connection characteristics for access and retrieval of data. In some implementations, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other applications. In some implementations, the these data sources 204, 206, and 208 may include Enterprise Resource Planning (ERP) databases or protocol databases that host data related to day-to-day enterprise activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of network resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points. As will be understood in view of the present disclosure, training data 218 may additionally, or alternatively, be provided from a third party, having been generated as synthetic data.

The machine learning model tuning engine 222 may be used to train a machine learning model to form a trained machine learning model 232 using the training data 218 to make predictions or decisions without explicitly being programmed to do so. The machine learning model 232 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms can adjust their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the machine learning model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the machine learning model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical enterprise decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It shall be understood that the implementation of the machine learning subsystem 200 illustrated in FIG. 2 is exemplary and that other implementations may vary. As another example, in some implementations, the machine learning subsystem 200 may include more, fewer, or different components.

FIGS. 3A-3B illustrate a process flow for requirements scoring and malfeasance detection via machine learning, in accordance with an implementation of the disclosure. The process may begin at block 302, where the system receives resource transfer data associated with an account identifier.

An account identifier may be any designation used within an entity system to attribute resource transfers and/or other activities with a specific user, group of users, or entity. For example, an account identifier may be a static (i.e., unchanged) number that is assigned to a user, group of users, or entity upon the creation of the account or beginning of a transactional relationship with the entity. Additionally, or alternatively, an account identifier may be dynamically generated based on predefined rules or algorithms such that the system modifies the account identifier over time or under specific conditions. The account identifier may also include alphanumeric sequences, cryptographic keys, biometric markers, or the like.

In some implementations, the account identifier may refer to a singular account that has transactions each related to a singular resource pool. In other implementations, the account identifier may correspond to an account that includes multiple distinct ledgers, each representing a separate set of transactions or resource pools.

"Resource transfer data" may refer to information associated with transfer entries recorded in a ledger linked to an account. This data may include, but is not limited to, the date and time of the resource transfer, a description of the resource transfer (including a string element, as will be described herein), the name or identifier of the vendor or recipient, the amount of the resource transferred, and any associated metadata. Resource transfer data may include a plurality of entries, each representing a distinct resource transfer, thereby providing a detailed record of activity within the ledger.

The resource transfer data may be stored in a database that allows for categorization, applying tags, and other manipulation to accounts. Such databases can be any type, including relational, NoSQL, graph, or in-memory, or the like.

The transfer entries of the resource transfer data may originate from one or more of several available channels, each channel being a mechanism or process through which resource transfers are initiated or recorded. These channels may include peer-to-peer transfers executed via mobile devices, counter-based or point-of-sale transactions facilitated through physical or digital payment systems, or automatically scheduled transfers to vendors based on predefined agreements or recurring obligations. Other channels may involve online purchases made through e-commerce platforms, bulk transfers initiated by batch processing systems, resource transfers triggered by smart contract execution in blockchain-based environments, or integrations with third-party financial services or applications. Additionally, or alternatively, resource transfers may arise from manual ledger updates, system-generated corrections, or reconciliation processes aimed at ensuring data integrity.

Each of the transfer entries may include a string element describing the transfer entry. Each string element may include various alphanumeric sequences that convey information about a resource transfer. For instance, a string element may contain the name of a merchant (e.g., "ABC_Cafe"), a transaction location (e.g., "NYC_5thAve"), or a purpose description (e.g., "Utilities Bill" or "Gift_Card_Purchase"). Additionally, or alternatively, the string element may include transaction identifiers, such as reference numbers (e.g., "TXN123456"), dates (e.g., "20231201"), or other contextual indicators. To accommodate character limits, words or phrases within the string element may be abbreviated (e.g., "Restaurant" shortened to "Rstrnt") or encoded using symbols and alphanumeric patterns (e.g., "New York Broadway" represented as "NY_Bdw").

Examples of complete string elements may include entries such as "TXN12345_CoffeeShop_20231201," indicating a transaction at a coffee shop on Dec. 1, 2023, with the transaction "TXN12345." is identifier Another example "Grocery_TXN98765_CityCenter," representing a grocery purchase at a location in City Center, identified by "TXN98765." Additional examples include "Bill_Internet_Provider_Invoice0987," which details an internet bill payment tied to invoice "Invoice0987," and "Fuel_TXN54321_Street202312," describing a fuel purchase at a station on a Street at a time, marked by identifier "TXN54321."

At block 304, the system may determine an obligation record in the resource transfer data based on the transfer entries comprising an obligation transaction. Given that the string elements of the transfer entries may be provided with any of the foregoing information, it shall be appreciated that an entity undertaking the present disclosure may encode predetermined sequences of numbers and/or letters into string elements in transfer entries associated with an obligation transaction (e.g., for a recurring auto-pay or one-time payment in support of rectifying the obligation record). In this way, it can be assumed that an account containing such transfer entries having such string elements is likely the beneficiary of an obligation record (i.e., is currently making resource transfers to repay an obligation).

Accordingly, a database of the predetermined sequence(s) (i.e., text samples) associated with obligation records may be referenced during direct string comparison, where the string element of each transfer entry is parsed and checked against each text sample for equality. Additionally, or alternatively, partial matches or substring detection may be implemented to locate occurrences of the sample text within the input string. Additionally, or alternatively, regular expressions ("regex") searching allows for acceptable variations of the predetermined text samples. For example, regex may allow for case-insensitive comparisons or the identification of string elements that meet specific structural rules. Additionally, or alternatively, fuzzy matching techniques, such as Levenshtein distance, may identify approximate matches by evaluating similarity scores between strings.

The process of block 304 may occur prior to any of the remaining steps occurring, and in some implementations upon a condition when the system does not identify any obligation records associated with the account via the searching methods outlined in block 304, the process may terminate and/or move forward with evaluating resource transfer data associated with other account identifiers. In this way, further evaluation and processing steps are not performed unnecessarily and computing resources may be preserved.

If an obligation record has been determined to be found via the process of block 304, the process may continue at block 306. At block 306, the system may segment the string element of each of the transfer entries into discrete tokens. The system identifies potential boundaries between words, subwords, or other linguistic elements based on a set of predefined rules or patterns. In some implementations, the system may rely on spaces or punctuation to delineate tokens. For example, spaces may indicate word boundaries, and punctuation marks may separate clauses or sentences. Additionally, or alternatively, the system may address language-specific challenges, such as processing contractions, hyphenated terms, or compound expressions. For instance, the string "can't" may be segmented into "can" and "'t," or a named entity like "New York" may be treated as a single token. In some implementations, dictionary-based or statistical models may also be applied to infer boundaries. Subword-based tokenization methods, such as byte-pair encoding or the like, may be used to handle rare or unknown words by breaking them into smaller, more frequent units.

Continuing with the previous example, the string element "TXN12345_CoffeeShop_20231201" may be segmented into tokens of "TXN12345", "CoffeeShop", and "20231201". The string element "Grocery_TXN98765_CityCenter" may be segmented into tokens of "Grocery", TXN98765", and "CityCenter". The string element "Bill_Internet_Provider_Invoice0987" may be segmented into tokens of "Bill", "Internet_Provider", and "Invoice0987". The string element "Fuel_TXN54321 SteetSt202312" may be segmented into tokens of "Fuel", "TXN54321", and "StreetSt202312."

At block 308, the system may normalize the discrete tokens into root tokens by applying a process that identifies the base form of each token. In certain implementations, the system may use lemmatization, which may involve analyzing the token in conjunction with linguistic rules and context, such as its part of speech, to determine the appropriate root form. For instance, the system may transform inflected words into their dictionary base forms, such as converting "running" to "run" or "better" to "good." In some implementations, stemming may also be used, where the system truncates tokens to a common base by removing affixes.

Next, at block, 310, the system may group related root tokens into grouped root tokens via fuzzy logic. Fuzzy logic may group related root tokens into grouped root tokens by assigning degrees of membership to elements in fuzzy sets to allow for flexible categorization based on linguistic or numerical similarities. Rather than defining strict boundaries, fuzzy logic may assess the extent to which a root token associates with one or more groups and potentially utilize membership functions. These functions may consider input parameters such as frequency, semantic similarity, or syntactic patterns to evaluate relatedness. Root tokens with overlapping memberships may then be aggregated into grouped root tokens using fuzzy operators such as union, intersection, or averaging.

Continuing with the previous example, words like "fuel" and "gas" or "transport" belong a group associated with the production of carbon dioxide (e.g., a group of words related to emissions requirements) with high certainty, while words like "CoffeeShop", "Internet", and "Grocery" belong to this group with low certainty. Other groups may be considered, for example, belonging to a group associated with methane, solar, or other type of energy, certain high-emissions locations, or the like.

Accordingly, weights for belonging to the carbon-dioxide group for terms in the token sequence of "TXN12345", "CoffeeShop", and "20231201" may be 0.2, 0.1, and 0.0, respectively, for example.

Weights for belonging to the carbon-dioxide group for terms in the token sequence of "Grocery", TXN98765", and "CityCenter" may be 0.0, 0.1, and 0.1, respectively, for example.

Weights for belonging to the carbon-dioxide group for terms in the token sequence of "Bill", "Internet_Provider", and "Invoice0987" may be 0.1, 0.1, and 0.1, respectively, for example.

Weights for belonging to the carbon-dioxide group for terms in the token sequence of "Fuel", "TXN54321", and "MainSt202312" may be 9.9, 0.1, and 0.1, respectively, for example.

At block 312, the system may then transform the grouped root tokens into categorical feature vectors. To transform grouped root tokens into categorical feature vectors, the system may assign a unique identifier to each grouped root token to establish distinct categories. A vocabulary or mapping table may be created to link each grouped root token to a specific index or category label.

Once the mapping is defined, a one-hot encoding scheme may be applied, wherein each grouped root token is represented as a binary vector of length equal to the total number of groups. For a given token, the vector may have a value of 1 at the position corresponding to its assigned group and 0 elsewhere. Alternatively, each token may be directly represented by its categorical index within the vector space.

In cases where a token belongs to multiple groups due to overlapping memberships, a multi-hot encoding or probabilistic vector representation may be utilized. Multi-hot encoding may assign 1 to multiple indices in the vector to reflect the token's membership in several groups. Probabilistic representation may assign fractional values or weights, derived from the token's degree of membership in each group, creating a soft categorical feature vector. In some implementations, these feature vectors may then be normalized or scaled to ensure consistency.

For example, the first value of a feature vector may represent the belonging to the carbon dioxide group (e.g., the sum of the weights for each of the terms), while the second value of the feature vector may represent the belonging to a particular geographic area, the third represents belonging to the methane group, and so forth. As such, the string element "TXN12345_CoffeeShop_20231201" may be represented by a categorical feature vector of [0.3, 1.3, 0.2].

The string element "Grocery_TXN98765_CityCenter" may be represented by a categorical feature vector of [0.2, 8.3, 1.0]. The string element "Bill_Internet_Provider_Invoice0987" may be represented by a categorical feature vector of [0.3, 1.0, 1.0]. The string element "Fuel_TXN54321_MainSt202312" may be represented by a categorical feature vector of [10.1, 2.0, 5.9].

Continuing at block 314, the system may determine a probability of each of the categorical feature vectors being associated with requirements. In other words, the system determines the probability that a group of words of a string element, represented by the weight provided to it via a categorical feature vector, is a word that provides an impact to requirements (i.e., emissions).

To do so, the system may implement a machine learning model comprising an ensemble learning model such as a random forest model. This machine learning model may be independent and distinct from other machine learning models described herein. Alternatively, one or more machine learning models may perform the actions of block 314 in addition to the actions described elsewhere herein. A Random Forest model may be trained on labeled data corresponding to feature vectors and/or string elements classified as related or unrelated to emissions.

Each categorical feature vector may be input to the trained model. The Random Forest classifier may assign the categorical feature vector, and/or its corresponding string element, to a predicted class, either related or unrelated, by evaluating the input of the categorical feature vector against learned decision thresholds in the trees. Simultaneously, the classifier calculates the probability of the categorical feature vector, and/or its corresponding string element, being associated with emissions by aggregating the predictions from individual trees. The probability of relevance to emissions may thus be determined as the proportion of trees deciding in favor of the "related" class.

Next, at block 316, the system may tag, as requirements resource transfers, the string element corresponding to categorical feature vectors that meet a probability threshold. The machine learning model, after determining a probability of the categorical feature vector(s) being associated with requirements, allows for the inference of each categorical feature vector to be associated with requirements based on comparing the probability to a predetermined threshold. If the probability is above (or in other implementations, below) the predetermined threshold, the system may tag the string element and and/or corresponding transfer entries associated with the categorical feature vector above (or below) the predetermined threshold as being "requirements resource transfers."

At block 318, the system may store the requirements resource transfers in a repository. In order to quickly recall and use the information contained in the requirements resource transfers (e.g., the amount of the resource transfer, merchant name, location, and so forth), the requirements resource transfers may be stored apart from the rest of the resource transfer data. In some implementations, the requirements resource transfers in this repository are created as duplicates. In other implementations, the resource transfer data may be modified to remove the requirements resource transfers and the requirements resource transfers may be transmitted to the repository.

Next, at block 320, the system may determine, using random forest regression model trained to apply a requirements calculation model, an aggregate requirements index (i.e., a score) for the requirements resource transfers by receiving respective categorical feature vectors. A random forest regression model may be trained using data sets that align string element attributes with compliance levels of requirements standards, and processes these categorical feature vectors. The model may use an ensemble of decision trees, each independently to evaluate the string element against specific requirements parameters including, but not limited to energy consumption (sometimes categorized by source type, such as fossil fuels, renewables, or nuclear energy), transportation factors, such as vehicle types, fuel efficiency, and distances traveled, industrial processes including chemical reactions and manufacturing outputs, waste generation, including landfill contributions and recycling rates, land-use practices, including deforestation, agriculture, and urban development, supply chain factors, such as raw material extraction, production, distribution, and end-of-life product handling, and direct emissions, such as on-site fuel combustion, and indirect emissions. The outputs of individual trees may be combined, such as through averaging, to produce a requirements index (i.e., a score) for the categorical feature vectors. The random forest regression model may use predefined requirements established as part of the training phase.

For example, the string element undergoes conversion into categorical feature vectors, where each vector encodes attributes such as carbon dioxide, geographic area, methane, and so forth. A training dataset may be created by annotating samples with requirements indexes derived from experts or simulations. The random forest regression model may be trained using this annotated data to capture the relationship between vectors and requirements compliance. When a new categorical feature vector is analyzed, the model may evaluate the feature vectors against the learned criteria and produces a requirements index.

In some implementations, the foregoing calculation of the requirements index may be performed for each of the requirements resource transfers tagged in block 316, individually (e.g., for each individual categorized feature vector), and then the requirements index for each may be aggregated to form an aggregated requirements index, such as through one or more statistical methods of the requirements indexes (e.g., calculation of mean, median, mode, range). Alternatively, requirements indexes may be aggregated and provided as the aggregate requirements index such as variance and standard deviation, skewness, kurtosis, and so forth.

In other implementations, categorized feature vectors of the requirements resource transfers may be combined prior to applying the random forest regression model in order to determine the aggregated requirements index. In this way, a single use of the random forest regression model may provide an aggregate requirements index for the entire resource transfer data. To combine the categorized feature vectors, their corresponding numerical values may be summed element-wise and divided by the number of vectors to compute the average.

It shall be appreciated that the aggregate requirements index represents the requirements adherence (e.g., emissions scores or the like) for the account identifier (i.e., all of the resource transfer data that pertains to requirements. In this way, a snapshot of the adherence to requirements for the entity or owner of the account identifier may be quantified upon computation of the aggregate requirements index.

Similarly, the aggregate requirements index may be monitored for a given account identifier over time, such as to determine if any changes to the aggregate requirements index occur (e.g., increasing or decreasing). To do so, the process may continue at block 322 of FIG. 3B, where the system may determine the aggregate requirements index of the requirements resource transfers at a predetermined interval.

In some implementations, the aggregate requirements index may be determined as an aggregate, meaning that requirements resource transfers used for prior aggregate requirements index are included in the subsequent aggregate requirements index determinations. In this way, outliers (i.e., high or low) aggregate requirements indexes are averaged into the subsequent aggregate requirements index, thereby reducing their impact over time and stabilizing the overall index. Alternative methods to traditional averaging may involve weighted averaging, where more recent requirements indexes are assigned greater significance than older ones, or exponential smoothing, which applies a decaying weight to older indexes. Another approach may involve median-based aggregation.

In other implementations, the aggregate requirements index may be determined for the requirements resource transfers only occurring in the predetermined interval. In this way, the aggregate requirements index reflects the most current and relevant data. This interval-based approach may improve responsiveness to recent changes in resource demands. Alternative methods may include dynamically adjusting the interval length based on system volatility or using rolling intervals to provide a continuous update while maintaining temporal relevance.

Next, at block 324, the system may identify requirements-directed obligation record malfeasance. Requirements-directed obligation record malfeasance may be indicative of an account or user who has previously received an obligation record from the entity in exchange for efforts to reduce emissions, adhere to requirements, and/or to invest in equipment, processes, or the like to reduce emissions.

However, accounts or users may obtain the obligation record in a malfeasant manner, such that the account or entity has no intention of reducing emissions or complying to requirements thereof. Similarly, accounts or users may obtain the obligation record and be unable to enact measures intended to reduce emissions or comply to requirements and thereafter neglect to return any resources distributed to the account or user as a result of the obligation record.

As such, it may be beneficial for the entity to track the progress, over time, of the account or user in adhering with the requirements or improving emissions to meet the requirements. In doing so, the entity will be able to discern whether emissions are improving or if there may be malfeasance.

To determine if requirements-directed obligation record malfeasance has occurred, or if a particular account identifier or user should be investigated for such malfeasance, a metric regarding a change of the aggregate requirements index may be determined. Stated differently, the aggregate requirements index may be calculated for a first interval, and at least one additional interval (e.g., a second interval), and the two (or more) aggregate requirements indexes may be compared to one another.

In some implementations, the metric determined may be a rate of change. The rate of change may be determined as the difference between the aggregate requirements index values divided by the duration between the intervals. Additionally, or alternatively, when comparing an aggregate requirements index calculated at multiple intervals, the rate of change may be determined for each consecutive pair of intervals, thereby generating a series of rate-of-change values. In some implementations, the rate of change may be calculated as an average rate of change over multiple intervals, providing an aggregated measure of change over a defined period. Additionally, or alternatively, the rate of change may account for non-uniform intervals by normalizing the change relative to the length of each interval.

Additionally, or alternatively, the metric determined may be a difference. The difference may be determined as the subtraction of the aggregate requirements index value at a first interval from the aggregate requirements index value at a second interval. Additionally, or alternatively, when comparing an aggregate requirements index calculated at multiple intervals, the difference may be determined for each consecutive pair of intervals, thereby generating a series of difference values. In some implementations, the difference may be calculated as a cumulative difference over multiple intervals, providing an aggregated measure of the overall change over a defined period. Additionally, or alternatively, the difference may account for non-uniform intervals by associating each difference with the corresponding interval duration or weighting each difference according to the interval length.

Additionally, or alternatively, the metric determined may be a change percentage. The change percentage may be determined as the difference between the aggregate requirements index value at a first interval and the aggregate requirements index value at a second interval, divided by the aggregate requirements index value at the first interval, and multiplied by 100. Additionally, or alternatively, when comparing an aggregate requirements index calculated at multiple intervals, the change percentage may be determined for each consecutive pair of intervals, thereby generating a series of percentage change values. In some implementations, the change percentage may be calculated as a cumulative percentage change over multiple intervals, providing an aggregated measure of the overall relative change over a defined period. Additionally, or alternatively, the change percentage may account for non-uniform intervals by associating each percentage change with the corresponding interval duration or weighting each percentage change according to the interval length.

Additionally, or alternatively, the metric determined may be a ratio. The ratio may be determined by dividing the aggregate requirements index value at a first interval by the aggregate requirements index value at a second interval. Additionally, or alternatively, when comparing an aggregate requirements index calculated at multiple intervals, the ratio may be determined for each consecutive pair of intervals, thereby generating a series of ratio values. In some implementations, the ratio may be calculated as a cumulative product of ratios over multiple intervals, providing an aggregated measure of relative proportional changes over a defined period. Additionally, or alternatively, the ratio may account for non-uniform intervals by associating each ratio with the corresponding interval duration or weighting each ratio according to the interval length.

Additionally, or alternatively, the metric determined may be a threshold value. The threshold value may represent a predefined or dynamically calculated boundary used to compare with the aggregate requirements index value at one or more intervals. Additionally, or alternatively, the threshold value may be used to determine whether the aggregate requirements index value exceeds, falls below, or meets the threshold at each interval. In some implementations, multiple threshold values may be defined for different intervals, allowing for interval-specific comparisons and generating a series of threshold evaluations over time. Additionally, or alternatively, the threshold value may adapt based on historical aggregate requirements index data or other contextual parameters to reflect changing conditions. In some implementations, deviations from the threshold value may be quantified and recorded, providing an indicator of how closely the aggregate requirements index aligns with expected or desired conditions.

Regardless of the metric type, the system may determine that requirements-directed obligation record malfeasance may have occurred, or if a particular account identifier or user should be investigated further, upon a condition (e.g., a "second condition") where the metric is above or below a predetermined threshold.

In some implementations, the metric may be determined by a machine learning model. In other implementations, the metric may be calculated by applying predefined mathematical formulas, statistical methods, or heuristic rules to the input data.

The machine learning model analyzes input data to identify patterns, correlations, or trends that may not be immediately apparent through traditional calculation methods. The model may be trained on historical data to recognize complex relationships between inputs and the desired metric. Based on this training, the model processes new input data to predict or estimate the metric with improved accuracy. The machine learning model may use techniques such as regression, classification, clustering, or neural networks, depending on the nature of the data and the desired output.

In some implementations, the machine learning model may continuously update its parameters by incorporating new data, thereby improving its accuracy and adapting to changing conditions. Additionally, or alternatively, the machine learning model may generate confidence scores or uncertainty estimates alongside the calculated metric to provide an indication of prediction accuracy.

Upon the determining of the requirements-directed obligation record malfeasance, the system may tag the account identifier as a malfeasance account with a malfeasance account identifier, as illustrated at block 326. For example, if the resource transfer data is stored in a relational database, tags may be implemented using dedicated tables and foreign key relationships. If NoSQL databases are implemented for the resource transfer data, tags may be stored as arrays or nested objects. If resource transfer data is stored in graph databases, account identifiers and tags may be represented by nodes connected by relationships. For in-memory databases, tags may use sets or hashes.

Additionally, or alternatively, each of the requirements resource transfers associated with the account identifier may be tagged. For example, in some implementations, each of the requirements resource transfers identified in block 316 may be tagged. Alternatively, only a subset of requirements resource transfers may be tagged. For example, the two or more requirements resource transfers that led to the identification of the requirements-directed obligation record malfeasance in block 324 may be tagged (i.e., those used to determine the metric above or below the predetermined threshold).

Continuing at block 328, in some implementations, the system may transmit the requirements resource transfers associated with the malfeasant account identifier to a second repository for further investigation. In some implementations, the requirements resource transfers associated with the malfeasant account identifier may be all of the requirements resource transfers of the account identifier. In other implementations, only a subset of requirements resource transfers may be transmitted to the second repository. For example, the two or more requirements resource transfers that led to the identification of the requirements-directed obligation record malfeasance in block 324 may be transmitted to the second repository (i.e., those used to determine the metric above or below the predetermined threshold).

The process may continue at block 330, where the system may generate an alert signal. The alert signal may include descriptors for the account identifier and the requirements resource transfers transmitted at block 328. The alert signal may be in a digital data format that relies on discrete logic to represent information or may be analog. The signal may present data in a packet-based structure that uses headers, payload fields, and parity bits for error detection. The signal may rely on standardized data integrity protocols and may adhere to a predetermined communications standard.

At block 332, the system may transmit the alert signal to an endpoint device. The endpoint device may belong to the entity and may be used by a user associated with the entity to monitor ongoing malfeasance.

As such, the alert signal may cause the endpoint device to display an alert banner. The alert banner may include a structured data payload formatted in a markup language (e.g., HTML, XML, or JSON) or a proprietary format, where the payload may include parameters, such as text content (e.g., the account identifier, the aggregate requirements index, obligation record details, and/or a rate of the change of the aggregate requirements index), font attributes (e.g., typeface, size, color), background color, layout dimensions, priority level, and display duration. Metadata fields may specify banner type (e.g., error, warning, informational), language localization codes, and expiration timestamps. The payload may also include embedded hyperlinks or icons, represented through base64-encoded images or reference URIs. To transmit the alert, the system may dispatch the payload via a communication protocol such as HTTP/HTTPS, MQTT, or WebSocket, possibly with encryption (e.g., TLS) for secure transmission. The endpoint device may receive the payload through a listening service, notification handler, or the like, parse the received data to extract display instructions, and pass these instructions to a graphical rendering engine of the endpoint device. The rendering engine may convert the formatting directives into a visually styled banner and overlay it within the user interface.

Next, at block 334, the system may receive, from the endpoint device, a feedback signal generated at the endpoint device in response to accepting or rejecting the identifying of the requirements-directed obligation record malfeasance. Event listeners within the endpoint device detect interactions with the banner (e.g., clicks on interaction elements such as buttons, slides on a slider, or the like) and trigger predefined actions (e.g., the action of block 336) or dismissals. In other words, the system may receive a feedback signal that is generated from an interaction with the alert banner, at the endpoint device (e.g., from the user clicking on an interaction element to accept or reject the assertion in the banner that there is requirements-directed obligation record malfeasance).

At block 336, the system may transmit the feedback signal (e.g., the signal generated at block 334) to the machine learning model as training data. In some implementations where the machine learning model in block 324 is separate from that of block 314, the feedback signal may be transmitted to only the machine learning model of block 324, only the machine learning model of block 314, or both the machine learning model in block 324 and the machine learning model of block 314. Regardless, the feedback signal may originate from the system's output and represent the deviation between the predicted outcome (e.g., that requirements-directed obligation record malfeasance exists in the account data) and the actual result (determined by a user or autonomously by a secondary machine learning model). The feedback signal may adjust weights within the machine learning model to minimize the error function, thereby enhancing prediction accuracy over successive training cycles. Each instance of a feedback signal may contribute to the model's improvement by providing real-time corrections that capture variations in data patterns. For example, the feedback signal may adjust weights to improve the predicting of the machine learning model of block 324 in determining the presence of requirements-direction obligation record malfeasance, and/or may adjust weights to improve the predicting of the machine learning model of block 314 that categorical feature vectors are associated with requirements.

As will be appreciated by one of ordinary skill in the art, the present disclosure may be implemented as an apparatus (including, for example, a system, a machine, a device, a computer program product, and/or the like), as a method (including, for example, an enterprise process, a computer-implemented process, and/or the like), as a computer program product (including firmware, resident software, micro-code, and the like), or as any combination of the foregoing. Many modifications and other implementations of the present disclosure set forth herein will come to mind to one skilled in the art to which these implementations pertain having the benefit of the teachings presented in the foregoing descriptions and the associated drawings. Although the Figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system for requirements scoring and malfeasance detection via machine learning, the system comprising:

a processing device; and a non-transitory storage device containing instructions, when executed by the processing device, the instructions cause the processing device to perform the steps of:

receiving resource transfer data associated with an account identifier, the resource transfer data comprising transfer entries from a plurality of channels, wherein each of the transfer entries comprises a string element describing the transfer entry;

determining an obligation record in the resource transfer data based on the transfer entries comprising an obligation transaction, wherein determining the obligation record comprises referencing a database of predetermined text samples associated with obligation records and parsing a string element of each transfer entry to detect, relative to at least one of the predetermined text samples, at least one of: (i) an equality match, (ii) a substring match, (iii) a regular-expression match, and (iv) a fuzzy match determined using a string-distance metric;

segmenting, for each of the transfer entries, the string element into discrete tokens;

normalizing the discrete tokens into root tokens using lemmatization;

grouping related root tokens into grouped root tokens via fuzzy logic, by assigning, using a membership function, a degree of membership of each root token to one or more fuzzy sets and aggregating the related root tokens into the grouped root tokens using one or more fuzzy operators;

transforming the grouped root tokens into categorical feature vectors, by mapping each grouped root token to an index in a vocabulary and generating a one-hot, multi-hot, or probabilistic vector representation based on the degrees of membership;

determining, using a machine learning model comprising an ensemble learning model, a probability of each of the categorical feature vectors being associated with requirements;

tagging, as requirements resource transfers, the categorical feature vectors upon a first condition where the probability is above a predetermined threshold;

storing the requirements resource transfers in a repository;

determining, using random forest regression model trained to apply a requirements calculation model, an aggregate requirements index for the requirements resource transfers by receiving respective categorical feature vectors;

determining the aggregate requirements index of the requirements resource transfers at a predetermined interval; and identifying, using the machine learning model, requirements-directed obligation record malfeasance upon a second condition where a change of the aggregate requirements index is above or below a predetermined rate.

2. The system of claim 1, wherein the instructions further cause the processing device to perform the steps of:

tagging, as a malfeasance account identifier, the account identifier upon the determining of the requirements-directed obligation record malfeasance;

transmitting the requirements resource transfers associated with the malfeasant account identifier to a second repository for further investigation;

generating an alert signal comprising descriptors for the account identifier and the requirements resource transfers; and transmitting the alert signal to an endpoint device.

3. The system of claim 2, wherein the instructions further cause the processing device to perform the steps of:

receiving, from the endpoint device, a feedback signal generated at the endpoint device in response to accepting or rejecting the identifying of the requirements-directed obligation record malfeasance; and transmitting the feedback signal to the machine learning model as training data.

4. The system of claim 3, wherein the alert signal causes the endpoint device to display an alert banner consisting of at least one of: (i) the account identifier, (ii) the aggregate requirements index, and (iii) a rate of the change of the aggregate requirements index.

5. The system of claim 4, wherein the feedback signal is generated as a result of an interaction with the alert banner.

6. A computer program product for requirements scoring and malfeasance detection via machine learning, the computer program product comprising a non-transitory computer-readable medium comprising code causing an apparatus to:

receive resource transfer data associated with an account identifier, the resource transfer data comprising transfer entries from a plurality of channels, wherein each of the transfer entries comprises a string element describing the transfer entry;

determine an obligation record in the resource transfer data based on the transfer entries comprising an obligation transaction, wherein determining the obligation record comprises referencing a database of predetermined text samples associated with obligation records and parsing a string element of each transfer entry to detect, relative to at least one of the predetermined text samples, at least one of: (i) an equality match, (ii) a substring match, (iii) a regular-expression match, and (iv) a fuzzy match determined using a string-distance metric;

segment, for each of the transfer entries, the string element into discrete tokens;

normalize the discrete tokens into root tokens using lemmatization;

group related root tokens into grouped root tokens via fuzzy logic, by assigning, using a membership function, a degree of membership of each root token to one or more fuzzy sets and aggregating the related root tokens into the grouped root tokens using one or more fuzzy operators;

transform the grouped root tokens into categorical feature vectors, by mapping each grouped root token to an index in a vocabulary and generating a one-hot, multi-hot, or probabilistic vector representation based on the degrees of membership;

determine, using a machine learning model comprising an ensemble learning model, a probability of each of the categorical feature vectors being associated with requirements;

tag, as requirements resource transfers, the categorical feature vectors upon a first condition where the probability is above a predetermined threshold;

store the requirements resource transfers in a repository;

determine, using random forest regression model trained to apply a requirements calculation model, an aggregate requirements index for the requirements resource transfers by receiving respective categorical feature vectors;

determine the aggregate requirements index of the requirements resource transfers at a predetermined interval; and identify, using the machine learning model, requirements-directed obligation record malfeasance upon a second condition where a change of the aggregate requirements index is above or below a predetermined rate.

7. The computer program product of claim 6, wherein the code further causes the apparatus to:

tag, as a malfeasance account identifier, the account identifier upon the determining of the requirements-directed obligation record malfeasance;

transmit the requirements resource transfers associated with the malfeasant account identifier to a second repository for further investigation;

generate an alert signal comprising descriptors for the account identifier and the requirements resource transfers; and transmit the alert signal to an endpoint device.

8. The computer program product of claim 7, wherein the code further causes the apparatus to:

receive, from the endpoint device, a feedback signal generated at the endpoint device in response to accepting or rejecting the identifying of the requirements-directed obligation record malfeasance; and transmit the feedback signal to the machine learning model as training data.

9. The computer program product of claim 8, wherein the alert signal causes the endpoint device to display an alert banner consisting of at least one of: (i) the account identifier, (ii) the aggregate requirements index, and (iii) a rate of the change of the aggregate requirements index.

10. The computer program product of claim 9, wherein the feedback signal is generated as a result of an interaction with the alert banner.

11. A method for requirements scoring and malfeasance detection via machine learning, the method comprising:

receiving resource transfer data associated with an account identifier, the resource transfer data comprising transfer entries from a plurality of channels, wherein each of the transfer entries comprises a string element describing the transfer entry;

determining an obligation record in the resource transfer data based on the transfer entries comprising an obligation transaction, wherein determining the obligation record comprises referencing a database of predetermined text samples associated with obligation records and parsing a string element of each transfer entry to detect, relative to at least one of the predetermined text samples, at least one of: (i) an equality match, (ii) a substring match, (iii) a regular-expression match, and (iv) a fuzzy match determined using a string-distance metric;

segmenting, for each of the transfer entries, the string element into discrete tokens;

normalizing the discrete tokens into root tokens using lemmatization;

grouping related root tokens into grouped root tokens via fuzzy logic, by assigning, using a membership function, a degree of membership of each root token to one or more fuzzy sets and aggregating the related root tokens into the grouped root tokens using one or more fuzzy operators;

transforming the grouped root tokens into categorical feature vectors, by mapping each grouped root token to an index in a vocabulary and generating a one-hot, multi-hot, or probabilistic vector representation based on the degrees of membership;

determining, using a machine learning model comprising an ensemble learning model, a probability of each of the categorical feature vectors being associated with requirements;

tagging, as requirements resource transfers, the categorical feature vectors upon a first condition where the probability is above a predetermined threshold;

storing the requirements resource transfers in a repository;

determining, using random forest regression model trained to apply a requirements calculation model, an aggregate requirements index for the requirements resource transfers by receiving respective categorical feature vectors;

determining the aggregate requirements index of the requirements resource transfers at a predetermined interval; and identifying, using the machine learning model, requirements-directed obligation record malfeasance upon a second condition where a change of the aggregate requirements index is above or below a predetermined rate.

12. The method of claim 5, wherein the method further comprises:

tagging, as a malfeasance account identifier, the account identifier upon the determining of the requirements-directed obligation record malfeasance;

transmitting the requirements resource transfers associated with the malfeasant account identifier to a second repository for further investigation;

generating an alert signal comprising descriptors for the account identifier and the requirements resource transfers; and transmitting the alert signal to an endpoint device.

13. The method of claim 12, wherein the method further comprises:

receiving, from the endpoint device, a feedback signal generated at the endpoint device in response to accepting or rejecting the identifying of the requirements-directed obligation record malfeasance; and transmitting the feedback signal to the machine learning model as training data.

14. The method of claim 13, wherein the alert signal causes the endpoint device to display an alert banner consisting of at least one of: (i) the account identifier, (ii) the aggregate requirements index, (iii) and (iii) a rate of the change of the aggregate requirements index.

15. The method of claim 14, wherein the feedback signal is generated as a result of an interaction with the alert banner.

* * * * *